United States Patent Office 3,021,346
Patented Feb. 13, 1962

3,021,346
METHOD OF PREPARING 1,4-PREGNADIENES
Sidney Fox, Spring Valley, and Mitchell Stanley Blicharz, Blauvelt, N.Y., and Victor Emil Origoni, Emerson, N.J., assignors to American Cyanamid Company, New York, N.Y., a corporation of Maine
No Drawing. Filed Jan. 21, 1958, Ser. No. 710,189
7 Claims. (Cl. 260—397.45)

This invention relates to an improved method of preparing 1,4-pregnadienes. More particularly, it relates to an improved yield by the selective release of the product from a selenium intermediate.

The preparation of $\Delta^{1,4}$ steroids from the corresponding $\Delta^4$ steroid has been described in the chemical literature. For example, Ringold et al., J. Org. Chem. 21, 239–40 (1956), describes the use of selenium dioxide in the preparation of $\Delta^{1,4}$ androstadiene-17β-ol-3-one from testosterone.

Florey and Restivo, J. Org. Chem. 22, 406–409 (1957), describe the selenium derivatives of $\Delta^{1,4}$-3-keto steroids that are formed by the action of $\Delta^4$-3-keto steroids with selenium dioxide. They repeated the work of Ringold, et al., and obtained yields of 12% of $\Delta^{1,4}$ steroid and 6% of a seleno $\Delta^{1,4}$ compound using a chromatographic separation of the products. The mother liquor of the above reaction was also processed chromatographically and yielded no additional $\Delta^{1,4}$ steroid.

In the above mentioned reference Florey and Restivo describe an experiment that shows that the selenium derivative does not form from the $\Delta^{1,4}$ product. The implication is that the selenium derivative is an intermediate in the $\Delta^{1,4}$ formation. This is also substantiated in a publication by a Japanese worker, Miki, J. Pharm. Soc. Japan, 75, 403 (1955). Miki isolated a monoselenium compound (in the related field of santonin chemistry) and on pyrolysis obtained a 30 to 40% yield of dienone.

We have now found that senenium dioxide oxidation of $\Delta^4$-3-keto steroids may be carried out under ideal conditions in yields of 50 to 70% of the desired $\Delta^{1,4}$-3-keto compound. This is accomplished by reacting the combined reaction product with a specially treated Raney nickel catalyst. Not only does this procedure effect increased yields, but it can also be shown that the products contain less residual selenium than do the non-nickel treated products.

The steroids on which the process of the present invention have been found particularly useful result in the compounds having the general formula:

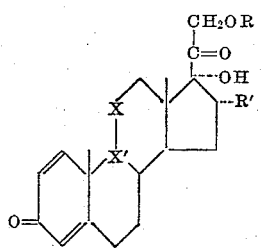

in which R is a member of the group consisting of hydrogen and lower alkanoyl radicals, R' is a member of the group consisting of hydrogen, hydroxyl and lower alkanoyloxy radicals and X—X' is a trivalent ethylene radical of the group consisting of:

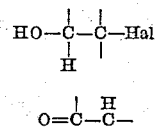

and

In the process of the present invention the 4-pregnene is reacted with selenium dioxide followed by the conversion of the selenium intermediate to the desired 1,4-pregnadiene. The usual method is the use of chromatographic separation to isolate the $\Delta^{1,4}$ compound which still has a comparatively high selenium content as shown hereinafter in Example 1.

We have found that the use of acetic acid treated Raney nickel catalyst produces a product in high yield containing a low selenium content.

A further advantage of our process is that it will more readily lend itself to commercial production since a chromatographic isolation is not required. The reaction with the partially deactivated Raney nickel preferably carried out at room temperature, although it will take place at a temperature of from 0° to 50° C. The reaction is completed in a period of from 30 minutes to several hours.

The Raney nickel is acid treated before use because it affords a better control over the process than does non-acid treated nickel. When fully active (non-treated) Raney nickel is used, there is a possibility of the reduction of the $\Delta^1$ and $\Delta^4$ bonds. Ideal results have been obtained with the partially deactivated Raney nickel prepared by mixing one part of Raney nickel with five volumes of dilute acetic acid (5 to 40%) and allowing the mixture to stand ten minutes to several hours. The acetic acid is then removed, the Raney nickel washed twice with water and finally twice with alcohol. In using the partially deactivated Raney nickel, one to five parts are used for each part of steroid.

The following examples show in detail the use of partially deactivated Raney nickel for the preparation of $\Delta^{1,4}$-3-keto steroids of the present invention.

*Example 1*

A solution of 1 gm. of $\Delta^4$-pregnene in 200 ml. tertiary butanol is swept with nitrogen. To this solution is added 1.1 gm. of selenium dioxide (previously mixed with 0.5 ml. water). The mixture is refluxed at 81° C. for 87 hours and subsequently cooled to 30° C. and filtered. The selenium residue is washed with tertiary butanol. The filtrate is evaporated to dryness. The residue weighs 1.6 gms. The residue is dissolved in 100 ml. of methylene chloride. The methylene chloride solution is washed with (a) 10 ml. of water, (b) 10 ml. dilute potassium bicarbonate, and (c) 10 ml. water, successively. The washed methylene chloride is allowed to stand for four hours and is then filtered to remove any red selenium precipitate that forms. The filtrate is treated with activated carbon. Five ml. of water and 3 grams of resin IR 4B are added to the dried methylene chloride extract and agitated for 10 minutes. After filtering the phases are separated and the methylene chloride dried over magnesium sulfate. On evaporation to dryness, the residue weighs 1.2 grams. The 1.2 grams residue is dissolved in 5 ml. of the mobile phase and 5 ml. stationary phase, mixed with 10 grams of diatomaceous earth and applied to a column (see below for column preparation), subsequently eluting with the mobile phase. In all, twenty-two fractions of 40 ml. are collected. Paper chromatographic analysis indicated the presence of 16α,21-diacetoxy 11β,-17α-dihydroxy 9α-fluoro-1,4-pregnadiene 3,20-dione in fractions 9–22. Fractions 9–22 are evaporated to dryness. The residue is dissolved in ethyl acetate, treated with activated carbon at 40° C., filtered and the filtrate is taken to dryness. The residue is dissolved in 5 ml. of toluene and, upon adding 1 to 2 drops of ethyl acetate, crystals are formed. After allowing to stand, the crystals are washed with cold toluene. The crystals are recrystallized out of ethyl acetate with petroleum ether. Two crops are obtained, yielding the following results:

|  | 1st crop | 2nd crop |
|---|---|---|
| Weight after one recrystallization (mg.) | 166 | 111. |
| Weight yield (percent) | 16.6 | 11.1. |
| Infra-red spectrum | Good $\Delta^{1,4}$ | Good $\Delta^{1,4}$. |
| $\lambda_{max}$. $E_{1\,cm.}^{mol.}$ | 12,800 | 14,030. |
| Polarographic assay (percent) | 106.0 | 100.1. |
| Chromatogram | Homogeneous $\Delta^{1,4}$ | Homogeneous $\Delta^{1,4}$. |
| Optical rotation (0.507 in CHCl$_3$) | +19.7 | +18.7. |
| Melting point (°C.) | 151–220 | 158–214. |
| Selenium content (p.p.m.) | 1,400 | 3,200. |

*Column preparation.*—Mix 667 ml. of chloroform, 400 ml. of petroleum ether (90–100° C.) and 133 ml. ethylene glycol. Upon equilibration, two phases are formed; the upper mobile phase, and the lower stationary phase. Mix 83 ml. of the stationary phase with 170 grams of diatomaceous earth and pack in a 4.5 cm. diameter column.

*Example 2*

A solution of 25.0 grams of 16α,21-diacetoxy-11β,17α-dihydroxy-9α-fluoro-4-pregnene-3,20-dione in 2100 ml. of tertiary butyl alcohol is swept with nitrogen. To this solution, 27.5 grams of selenium dioxide dissolved in 25 ml. of water is added. The mixture is refluxed for 50 hours at 81° C., cooled to 25° C., and filtered to remove the black selenium residue. The selenium residue is washed with tertiary butyl alcohol and the filtrate and washes are evaporated to dryness under reduced pressure. The residue is taken up in 1000 ml. of chloroform, and the insolubles are removed by filtration. The chloroform solution is washed with (*a*) 200 ml. of water saturated with sodium chloride, (*b*) 100 ml. of water saturated with sodium bicarbonate, (*c*) three times with 100 ml. portions of water saturated with sodium chloride. The washed chloroform solution is dried over magnesium sulfate and evaporated under reduced pressure. The residue is dissolved in 250 ml. of methanol. Five equal aliquots of 50 ml. of methanol each are prepared and treated with partially deactivated Raney nickel catalyst as follows:

(*a*, *b*) Each slurried with 5 ml. of partially deactivated Raney nickel for two hours.

(*c*) slurried with 5 ml. of partially deactivated Raney nickel for one hour, filtered and repeated the treatment.

(*d*) Slurried for one hour with 5 ml. of active Raney nickel catalyst, filtered off the catalyst and treated the filtrate one hour with partially deactivated Raney nickel.

(*e*) Slurred for two hours with 25 ml. of partially deactivated Raney nickel.

The spent catalyst is removed by filtration and the filtrates are evaporated to dryness under reduced pressure. The residues are each dissolved in 100 ml. of chloroform. The choloroform solutions are washed with (*a*) 50 ml. of 0.25% acetic acid, (*b*) 50 ml. of water saturated with sodium chloride and dried over magnesium sulfate. The dried chloroform solutions of *a*, *c*, *d*, and *e* are evaporated on the steam bath to 5 ml. and the crystallization is allowed to take place over the weekend. Aliquot (*b*) is evaporated to dryness and passed through a partition column using the procedure described in Example 1. The products are recovered by filtration and washed with chloroform. The following results are obtained:

|  | A[1] | B (partition column) | | | C | D | E |
|---|---|---|---|---|---|---|---|
|  |  | Cuts 13–16 | Cuts 17–20 | Cuts 21–24 |  |  |  |
| Weight of product (g.) | 1.473 | 1.041 | 1.045 | 0.061 | 2.673 | 2.054 | 2.559. |
| Weight yield (percent) | 29.5 | 20.8 | 20.9 | 1.1 | 53.4 | 41.1 | 51.5. |
| Polarographic assay (percent) | 100.5 | 91.6 | 92.8 |  | 93.7 | 90.2 | 65.5. |
| Infra-red spectrum | Good $\Delta^{1,4}$ | Good $\Delta^{1,4}$+ CHCl$_3$ solvate. | Good $\Delta^{1,4}$+ CHCl$_3$ solvate. | Good $\Delta^{1,4}$ | Good $\Delta^{1,4}$+ CHCl$_3$ solvate. | Good $\Delta^{1,4}$ | Impure $\Delta^{1,4}$. |
| $\lambda_{max}$. $E_{1\,cm.}^{mol.}$ | 14,445 | 13,100 | 13,800 | 14,000 | 13,345 | 14,367 | 9,954. |
| Optical rotation | +29.2 | +19.2 | +19.8 | +17.2 | +20.0 | +20.8 | +21.2. |
| Blue tetrazolium assay (percent) | 109.2 | 89.9 | 102.5 |  | 103.7 | 109.4 | 92.6. |
| Chromatogram | Homogeneous $\Delta^{1,4}$ | Homogeneous $\Delta^{1,4}$ | Homogeneous $\Delta^{1,4}$ | Homogeneous $\Delta^{1,4}$ | Homogeneous $\Delta^{1,4}$ | Homogeneous $\Delta^{1,4}$ | $\Delta^{1}$, $\Delta^{1,4}$ plus unknown. |
| Melting point (°C.) | 160–211 | 152–189+ | 150–185+ | 180–226 | 145–199+ | 157–218 | 132–185+. |
| Selenium content (p.p.m.) | 250–400 | 40 | 20 | 250–400 | 300 | 90 | 20. |

[1] Without the additional nickel treatment, a gum formed in attempting to isolate a second crop. When the mother liquor of "A" (this aliquot was originally treated once with one teaspoon of partially deactivated nickel) was treated with an additional teaspoon of partially deactivated Raney nickel, additional product was obtained.

NOTE.—Weight of 2nd crop (g.), 1.28; percent weight yield, 25.6; polarographic assay (percent), 77.5; infra-red spectrum, good $\Delta^{1,4}$+ CHCl$_3$; $\lambda_{max}$. $E_{1\,cm.}^{mol.}$, 12,500; optical rotation, +16.2; chromatogram $\Delta^{1,4}$+spot at origin; Blue tetrazolium assay (percent), 94.4.

*Example 3*

Twenty grams of 16α,21-diacetoxy-11β,17α-dihydroxy-9α-fluoro-4-pregnene-3,20-dione is oxidized according to the procedure described in Example 2 for a period of 63 hours. An aliquot of the methyl alcohol solution equivalent to 10 grams of starting 16α,21-diacetoxy-11β,17α-dihydroxy-9α-fluoro-4-pregnene-3,20-dione is treated with Raney nickel catalyst as described in "c" of Example 2. Following the nickel treatment, the catalyst is removed by filtration and the filtrate is evaporated to dryness under reduced pressure. The residue is dissolved in 700 ml. of chloroform and washed with (*a*) 50 ml. of water saturated with sodium bicarbonate, (*b*) 50 ml. of water saturated with sodium chloride, (*c*) 100 ml. of 1% acetic acid, and (*d*) 50 ml. of water saturated with sodium chloride. The washed chloroform solution is dried over magnesium sulfate and divided into aliquots "A" and "B"; each equivalent to 5.0 grams of the starting 16α,21-diacetoxy-11β,17α-dihydroxy-9α-fluoro-4-pregnene-3,20-dione. Aliquot "A" is evaporated to dryness under reduced pressure and reacetylated in pyridine with acetic anhydride. The 16α,21-diacetoxy-11β,17α-dihydroxy-9α-fluoro-1,4-pregnadiene-3,20-dione is isolated from chloroform as described in Example 2. Aliquot "B" is evaporated on the steam bath to 7 ml.; the crystallization is allowed to take place over a period of 48 hours and the product is removed by filtration. The crystals are washed with chloroform and dried under reduced pressure at 80° C. for 16 hours.

|                                      | A                       | B                         |
|--------------------------------------|-------------------------|---------------------------|
| Weight of product (g.)               | 2.38                    | 2.91.                     |
| Weight yield (percent)               | 47.6                    | 58.2.                     |
| Polarographic assay (percent)        | 84.4                    | 99.8.                     |
| Infra-red spectrum                   | Good $\Delta^{1,4}$+CHCl$_3$ | Good $\Delta^{1,4}$+CHCl$_3$. |
| $\lambda_{max}.E_{1\,cm}^{mol.}$     | 12,950                  | 13,690.                   |
| Optical rotation                     | +17.3                   | +19.2.                    |
| Blue tetrazolium assay (percent)     | 93.4                    | 102.8.                    |
| Chromatogram                         | Homogeneous $\Delta^{1,4}$ | $\Delta^{1,4}$+spot at origin. |
| Meltint point (°C.)                  | 145–195                 | 145–195.                  |
| Selenium content (p.p.m.)            | 100                     | 700.                      |

*Example 4*

A further experiment is carried out using 25.0 g. of 16α,21 - diacetoxy - 11β,17α-dihydroxy-9α-fluoro-4-pregnene-3,20-dione which is oxidized according to the procedure described in Example 2 for a period of 64 hours. An aliquot of the methyl alcohol solution equivalent to 15 grams of starting 16α,21-diacetoxy-11β,17α-dihydroxy-9α-fluoro-4-pregnene-3,20-dione is treated with partially deactivated Raney nickel catalyst and processed to final crystals as described in "c" of Example 2.

| | |
|---|---|
| Wt. of product (g.) | 8.07 |
| Wt. yield (percent) | 53.7. |
| Polarographic assay (percent) | 85. |
| Blue tetrazolium assay (percent) | 93.2. |
| Infra-red spectrum | Weak aliphatic CH$_2$ (+CHCl$_3$). |
| $\lambda_{max}.(E_{1\,cm}^{mol.})$ | 13,300. |
| Optical rotation | +19.1. |
| Chromatogram | $\Delta^{1,4}$ plus spot at origin. |
| Melting point | 149.0–180° C.+. |
| Selenium content (p.p.m.) | 240. |

A second crop was obtained upon further reducing the mother liquor volume and allowing to stand at room temperature.

| | |
|---|---|
| Wt. of 2nd crop (g.) | 1.91. |
| Wt. yield (percent) | 12.7. |
| Polarographic assay (percent) | 73.4. |
| Blue tetrazolium assay (percent) | 98.8. |
| Infra-red spectrum | $\Delta^{1,4}$ maximum is weak (+CHCl$_3$). |
| $\lambda_{max}.(E_{1\,cm}^{mol.})$ | 12,400. |
| Optical rotation | +16.7. |
| Chromatogram | $\Delta^{1,4}$+faint spot at origin. |
| Melting point | 140–180° C.+. |
| Selenium content (p.p.m.) | 320. |

Total weight of 16α,21-diacetoxy-11β,17α-dihydroxy-9α-fluoro-1,4-pregnadiene-3,20-dione is 9.98 g. representing a yield of 66.4%.

*Example 5*

Ten grams of 9α-fluorohydrocortisone acetate is processed to the $\Delta^1$-9α-fluorohydrocortisone acetate according to the procedure described in Example 3(b). The chloroform solution of the residue obtained after the nickel treatment is evaporated to dryness and taken up in 150 ml. of methanol. A crystalline product is obtained by adding 225 ml. of warm water to the methanol solution and allowing to stand overnight. The product 9α-fluorohydrocortisone acetate to $\Delta^1$-9α-fluorohydrocortisone acetate is washed with cold methanol and dried under reduced pressure at 40° C. for six hours.

|                                      | 1st crop                    | 2nd crop                  |
|--------------------------------------|-----------------------------|---------------------------|
| Weight of product (g.)               | 4.80                        | 0.56.                     |
| Weight yield percent                 | 48.0                        | 5.6.                      |
| Polarographic assay (percent)        | 93.5                        | 99.7.                     |
| Infra-red spectrum                   | Good $\Delta^{1,4}$         | Good $\Delta^{1,4}$       |
| $\lambda_{max}.E_{1\,cm}^{mol.}$     | 13,680                      | 13,800.                   |
| Optical rotation                     | +85° C                      | +88.5° C.                 |
| Chromatogram                         | $\Delta^{1,4}$ and $\Delta^4$ | $\Delta^{1,4}$ and $\Delta^4$ |
| Melting point (° C.)                 | 227.2–238.5                 | 233.8–237.5.              |
| Selenium content (p.p.m.)            | 250–400                     | 250–400.                  |

*Example 6*

To five grams of 16α,21-diacetoxy-17α-hydroxy-4-pregnene-3,11,20-trione dissolved in 500 ml. tertiary butanol is added five grams of selenium dioxide in five cc. of water. The flask is swept with nitrogen and refluxed at 80°–82° C. for 68 hours. The selenium is filtered off. The filtrate is evaporated to dryness and the residue dissolved in 200 ml. chloroform. Inorganic selenium salts are filtered off. Two 75 ml. portions of saline solution are used to wash the chloroform solution which is then dried over magnesium sulfate and evaporated to dryness. Weight of crude is 6.25 grams. The crude product is dissolved in 100 ml. methanol, heated to 60° C., and about seven grams of partially deactivated Raney nickel (slurried in ethanol) is added. After slurrying at 60° C. for 20 minutes, the filtrate is evaporated to dryness. The residue is dissolved in 100 ml. of chloroform. Two 50 ml. portions of saline solution are used to wash the chloroform solution, and the chloroform extract is dried over magnesium sulfate. The solution is filtered and evaporated to dryness. The weight of the crude product is 5.06 grams. The crude product is dissolved in 25 ml. of toluene, 200 ml. of ether added and filtered. The filtrate is evaporated to dryness, and the resulting residue is dissolved in 15 ml. toluene. The solution is heated and 4 ml. of petroleum ether added to crystallize out the final product. The 16α,21-diacetoxy-17α-hydroxy-1,4-pregnadiene-3,11,20-trione weighs 1.15 grams.

|                                  | 1st crop            | 2nd crop           |
|----------------------------------|---------------------|--------------------|
| Weight of product                | 1.15 g              | 2.9 g.             |
| Weight yield (percent)           | 23                  | 58.0 g.            |
| Infra-red spectrum               | Good $\Delta^{1,4}$ |                    |
| $\lambda_{max}.E_{1\,cm}^{mol.}$ | 14,080              |                    |
| Optical rotation                 | +89.4               |                    |
| Chromatogram                     | $\Delta^{1,4}$      | $\Delta^{1,4}$.    |
| Melting point (° C.)             | 205–208             | 202–206.           |

*Analysis.*—Calc'd $C_{25}H_{30}O_8$:

|           | Found  | Calc'd |
|-----------|--------|--------|
| C         | 65.71  | 65.4   |
| H         | 7.09   | 6.59   |
| O acetyl  | 18.25  | 18.74  |

We claim:
1. In a process for the preparation of 3-keto-1,4-pregnadienes having the general formula:

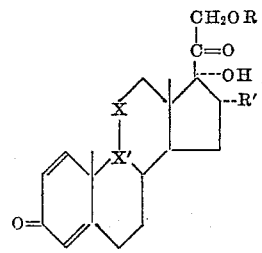

in which R is a member of the group consisting of hydrogen and lower alkanoyl radicals, R' is a member of the group consisting of hydrogen, hydroxyl and lower alkanoyloxy radicals and —X—X'< is a trivalent ethylene radical of the group consisting of

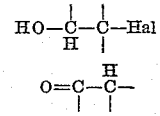

and

by heating the corresponding 1,2-hydrogenated steroid with selenium dioxide, the improvement which comprises removing by filtration insoluble residual selenium, mixing the filtrate with partially deactivated Raney nickel catalyst at a temperature within the range of 0 to 50° C., filtering said catalyst from the reaction mixture and recovering said 3-keto-1,4-pregnadienes substantially free from other steroids.

2. An improved method in accordance with claim 1 in which the product prepared is 16α,21-diacetoxy-11β,17α-dihydroxy-9α-fluoro-1,4-pregnadiene-3,20-dione.

3. An improved method in accordance with claim 1 in which the product prepared is 16α,21-diacetoxy-17α-hydroxy-1,4,9(11)-pregnatriene-3,20-dione.

4. An improved method of preparing 16α,21-dilower alkanoyloxy-11β,17α-dihydroxy-9α-halo - 1,4 - pregnadiene-3,20-dione which comprises reacting 16α,21-dilower alkanoyloxy - 11β,17α - dihydroxy-9α-halo-4-pregnene-3,20-dione with selenium dioxide, removing residual selenium, subjecting the reaction product to partially deactivated Raney nickel catalyst at a temperature within the range of 0 to 50° C. and recovering said compounds therefrom substantially free from other steroids.

5. In a method of preparing 16α,21-diloweralkanoyloxy-11β,17α-dihydroxy-9α-halo - 1,4 - pregnadiene-3,20-diones of increased purity from 16α,21-dilower alkanoyloxy-11β,17α-dihydroxy-9α-halo-4-pregnene - 3,20 - diones by selenium oxidation, the step which comprises subjecting the selenium oxidation reaction product to partially deactivated Raney nickel catalyst at a temperature within the range of 0 to 50° C. and recovering said product therefrom substantially free from other steroids.

6. An improved method of preparing 21-acetyloxy-11β,17α - dihydroxy-9α-fluoro-1,4-pregnadiene-3,20-dione which comprises reacting 21-acetyloxy-11β,17α-dihydroxy-9α-fluoro-4-pregnene-3,20-dione with selenium dioxide, removing residual selenium, subjecting the reaction product to partially deactivated Raney nickel catalyst at a temperature within the range of 0 to 50° C. and recovering said compound therefrom substantially free from other steroids.

7. An improved method of preparing 16α,21-dilower alkanoyloxy-11β,17α-dihydroxy-9α-halo - 1,4 - pregnadiene-3,20-dione which comprises reacting 16α,21-dilower alkanoyloxy-11β,17α-dihydroxy - 9α - halo-4-pregnene-3,20-dione with selenium dioxide, removing residual selenium, subjecting the reaction product to partially deactivated Raney nickel previously treated with acetic acid at a temperature within the range of 0 to 50° C. and recovering said compounds therefrom substantially free from other steroids.

References Cited in the file of this patent

UNITED STATES PATENTS

| | | |
|---|---|---|
| 2,864,834 | Mendelsohn et al. | Dec. 16, 1958 |
| 2,875,196 | Florey | Feb. 24, 1959 |
| 2,900,398 | Wettstein et al. | Aug. 18, 1959 |

OTHER REFERENCES

Szpilfogel: Recueil des Travaux Chimiques des Pays-Bas, May 1956, pages 475–480.